United States Patent [19]
Nelson

[11] Patent Number: 4,466,735
[45] Date of Patent: Aug. 21, 1984

[54] HALF TONE SCREEN EXPOSURE APPARATUS

[75] Inventor: Erik K. Nelson, Fairport, N.Y.

[73] Assignee: Itek Corporation, Lexington, Mass.

[21] Appl. No.: 403,205

[22] Filed: Jul. 29, 1982

[51] Int. Cl.³ .............................................. G03B 27/72
[52] U.S. Cl. ........................................ 355/71; 355/70
[58] Field of Search ................................. 355/71, 70

[56] References Cited

U.S. PATENT DOCUMENTS

| | | | |
|---|---|---|---|
| 2,384,578 | 9/1945 | Turner | 350/314 |
| 4,059,357 | 11/1977 | Klein | 356/243 |
| 4,135,813 | 1/1979 | Frank et al. | 355/71 |
| 4,260,256 | 4/1981 | Smart | 356/235 |

Primary Examiner—Richard A. Wintercorn
Attorney, Agent, or Firm—Homer O. Blair; Robert L. Nathans; Gerald H. Glanzman

[57] ABSTRACT

A half tone screen of a graphic camera is uniformly exposed by a pinhole light projector positioned off axis with respect to the main optical projection axis. A light diffuser is positioned intermediate a light source and the pinhole has a variable density light attenuator pattern consisting of a plurality of circular lines for attenuating the light passing through the diffuser and aperture in a manner to produce uniform illumination of the half tone screen.

20 Claims, 3 Drawing Figures

HALF TONE SCREEN EXPOSURE APPARATUS

BACKGROUND OF THE INVENTION

The present invention relates to apparatus involved in making half-tone photographic exposures which are used to reproduce continuous tone original copy by printing.

It is desirable to eliminate operator intervention, and thus automate, the supplemental flashing and/or bumping steps involving exposing the photosensitive sheet to non-image light. Such procedures are well known to those skilled in the art and are explained in columns 1 and 2 of U.S. Pat. No. 4,275,961 to Fontana, incorporated by reference herein. The steps of flashing a plain non-image bearing card positioned over the original copy on the copy board, or shining a light through the camera lens, previously performed manually, are eliminated, to more completely automate the operation of the graphic camera. In accordance with such automation, a computation device, not part of the present invention, is employed to actuate a flash lamp for a precise interval as a function of various parameters which are fed to the computation device.

SUMMARY OF THE INVENTION

In accordance with the preferred embodiment, a pinhole projection device having a flash lamp and a single light diffuser situated between the flash lamp and the pinhole, is positioned within the bellows of the graphic camera, the pinhole facing the film platen. A variable density light attenuation pattern is formed upon the side of the light diffuser facing the flash lamp, the pattern including a plurality of constant density circular lines concentric with a central bullseye point positioned at the optical axis of the projector. The spaces between the lines continuously increases along radial paths emanating from the central bullseye point in a manner to cause the film platen to be uniformly illuminated upon the actuation of the flash lamp, in spite of the fact that the pinhole projector is positioned off axis with respect to the main projection axis of the graphic camera.

Other objects features and advantages of the present invention will become apparent upon study of the following detailed description taken in conjunction with the drawings in which.

DETAILED DESCRIPTION

Figure 1:
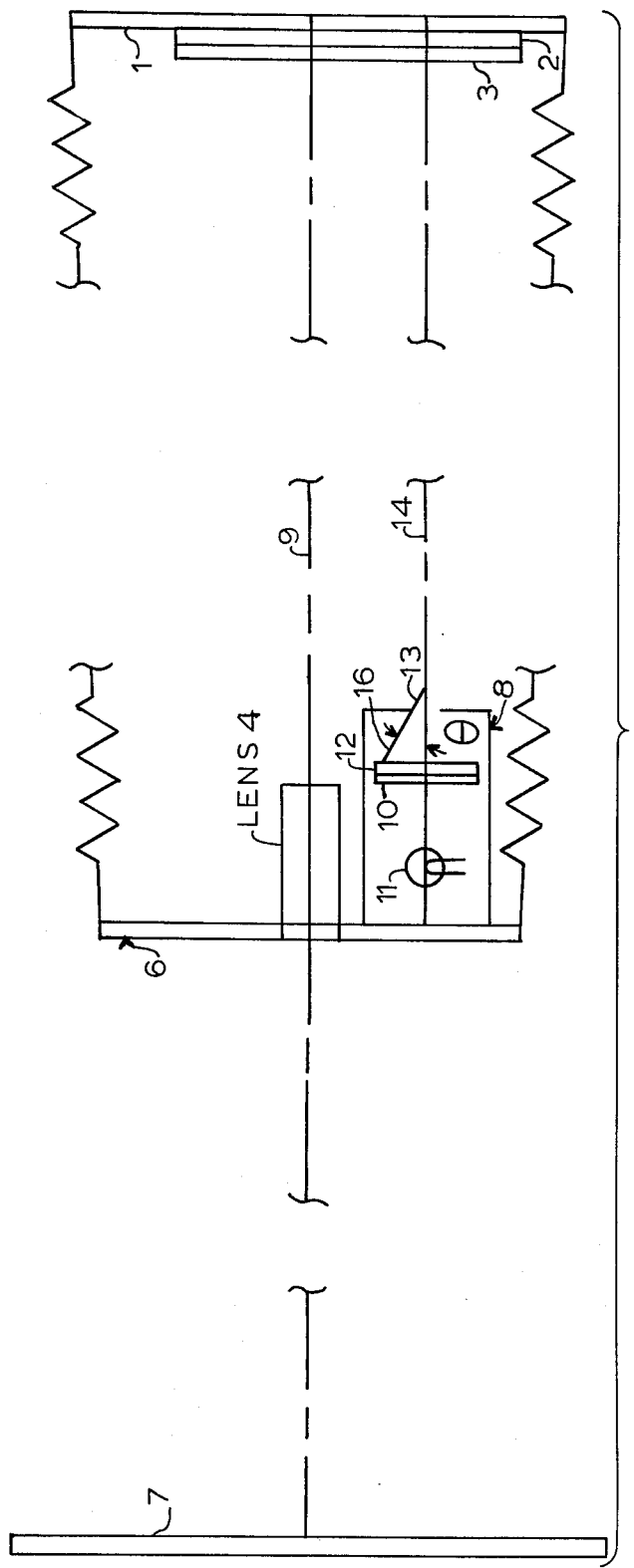
FIG. 1 illustrates a front sectional of the preferred embodiment.
Figure 3:
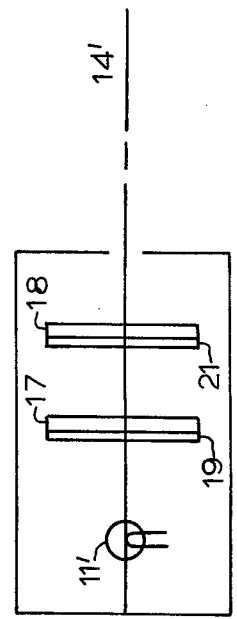
FIG. 3 illustrates a second embodiment of the projector.
Figure 2:
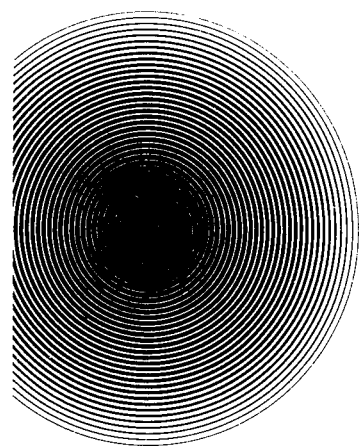
FIG. 2 illustrates the preferred attenuation pattern.

Referring now to FIG. 1, film platen 1 is illustrated with photosensitive sheet 2 and half-tone screen 3 positioned upon the film platen. A main projection lens 4 is mounted upon conventional light tight bellows apparatus 6, which is employed to change the object and image distances upon changes in desired magnification. Copy board 7 is illustrated in a vertical position and bears objects which are imaged upon film platen 1 by lens 4 in the conventional manner. An auxiliary projection device 8 is situated within bellows apparatus 6 and is positioned off axis with respect to the main projection axis 9, as indicated in FIG. 1. A light source such as a 3800° K. quartz-halogen lamp 11 is provided, together with light diffusion means 12 and a pinhole aperture 13, as shown. The light diffusion means comprises an opal glass light scattering body, together with the above-mentioned variable density pattern or mask schematically illustrated at 10, which is affixed to body 12 at the side thereof facing light source 11. A preferred configuration of pattern 10, illustrated in FIG. 2, comprises a plurality of circular constant density rings concentric with a central bullseye point, the spaces between the circular lines increasing as the distances along radial paths emanating from the central bullseye point increases. In the illustrated pattern, the line thicknesses decrease outwardly to increase the spaces between lines, while the pitch of the line placement is constant. Alternatively, the spaces between lines could be increased by providing constant width lines having increased separations outwardly along the radial lines. The preferred pattern of FIG. 2 mounted upon a single light scattering diffusion plate 12 is configured so that the light attenuation characteristic decreases with increased distances away from the central bullseye point on the axis 14, proportional to the cosine$^8$ of the angle $\theta$ formed by the optical projection axis 14 and straight line 16 extending between points on the radial paths and the center of pinhole 13 at optical axis 14. The use of such a pattern, positioned upon the face of a single light diffusion glass body, will result in illumination of the half-tone screen, upon film platen 1, of uniform light intensity in spite of the fact that projector 8 is offset with respect to optical axis 9. If the circular line pattern mask were not employed in conjunction with glass diffusion plate 12, non-uniform platen illumination would result, due to the well-known cosine$^4$ law. Even if light source 11 had a large uniform intensity light emitting surface congruent with the surface of light diffusion plate 12, non-uniformity of the light projected upon platen 1, through the pin-hole aperture 13 would still result, owing to the well-known cosine$^4$ law. Further non-uniformity is introduced, since it is desirable from an engineering standpoint to illuminate the diffuser plate with a light source such as lamp 11, having a light emitting area substantially smaller than the side of the light diffusion plate facing lamp 11. This creates a further reduction in the intensity of the light produced at the right-hand outer portions of the light diffuser 12, which reduction increases at distances further off axis from ancillary projection axis 14. Accordingly, in order to uniformly illuminate that portion of platen 1 bearing the half-tone screen, a line pattern having an attenuation characteristic proportional to cos$^8$ $\theta$ and a single diffuser plate is preferred. Should diffuser plate 12 be uniformly illuminated by another type of light source, a cos$^4$ $\theta$ attenuation pattern would be employed to uniformly illuminate the half-tone screen. For example, in FIG. 3, a pair of light diffusion plates 17 and 18 could be provided having cos$^4$ $\theta$ circular masking patterns 19 and 21 formed upon the left-hand sides of the plates facing the smaller flash lamp light source 11'. Pattern 19 produces uniform illumination of pattern 21, since the circular cosine$^4$ $\theta$ pattern compensates for falloff in illumination intensity at further distances from axis 14'. If the second light diffusion plate 17 with pattern 21 thereon were not employed, the uniform light produced at the right-hand portion of diffuser plate 17 would produce non-uniform illumination upon the platen surface, due to the cosine$^4$ law. Thus, the second cosine$^4$ pattern 21 formed upon a second diffuser plate 18 is employed, so that light emitted at the right-hand side of diffuser 18 is less intense at central portions and more intense at outer portions thereof to uniformly illuminate the half tone screen. The bullseye points of the patterns are positioned on axis 14′. The cosine$^8$ pattern shown in FIG. 2 is the actual pattern employed in cameras to be manufactured by the assignee of the present invention. While the offset distance between main projection axis 9 and ancillary projector axis 14 is not critical, this distance was about 4″ in the actual embodiment constructed in accordance with the invention. The pinhole size is not critical. The flash lamp was a G.E. lamp DZE/FDS which was typically illuminated for a period of 20 seconds, at 100% magnification. The FIG. 2 pattern has a diameter of 2.0 inches.

While the above described embodiments of the invention are preferred, other configurations will be readily apparent to those skilled in the art and thus the invention is only to be limited in scope by the language of the following claims, including reasonable equivalents thereof. For example, while an approximately ¼″ diameter pinhole is preferred to save costs, a small projection lens could form part of the optical aperture found in the right-hand portion of the projector.

I claim:

1. In a graphic camera having a copyboard, a film platen for positioning a photosensitive sheet and a half-tone screen thereover, together with a main projection lens positioned upon a projection optical axis for focusing images of objects upon said copyboard at said film platen, the improvement comprising an auxiliary projection device positioned off axis with respect to said main projection optical axis and upon a second optical axis separate from said first optical axis for exposing said photosensitive sheet to light, said projection device further comprising:
    a. a light source positioned at one portion of said auxiliary projection device;
    b. a light transmitting aperture positioned at a second portion of said auxiliary projection device upon said second optical axis; and
    c. light diffusion means, optically intermediate said light source and said aperture, having a variable density pattern associated therewith, said pattern including a plurality of light attenuating arcuate lines, the spaces between said arcuate lines continuously increasing in a manner to cause said film platen to be uniformly illuminated by light passing through said aperture upon the actuation of said light source.

2. In a graphic camera having a copyboard, a film platen for positioning a photosensitive sheet and a half-tone screen thereover, together with a main projection lens positioned upon a projection optical axis for focusing images of objects upon said copyboard at said film platen, the improvement comprising an auxiliary projection device for exposing said photosensitive sheet to light, said projection device further comprising:
    a. a light source positioned at one portion of said auxiliary projection device;
    b. a light transmitting aperture positioned at another portion of said auxiliary projection device;
    c. a light diffusion means having one portion thereof facing said light source and another portion opposite thereof facing said light transmitting aperture, and having a variable density pattern on said one side of said light diffusion means facing said light source, said pattern including a plurality of light attenuating arcuate lines, the spaces between said arcuate lines continuously increasing in a manner to cause said film platen to be uniformly illuminated by light passing through said aperture upon the actuation of said light source.

3. In a graphic camera having a copyboard, a film platen for positioning a photosensitive sheet and a half-tone screen thereover, together with a main projection lens positioned upon a first optical axis for focusing images of objects upon said copyboard at said film platen, the improvement comprising an auxiliary projection device positioned on a second optical axis parallel to said first optical axis for exposing said photosensitive sheet to light, said projection device further comprising;
    a. a light source positioned at one portion of said second projection device;
    b. a light transmitting aperture positioned at another portion of said auxiliary projection device; and
    c. light diffusion means having one portion thereof facing said light source and another portion thereof facing said light transmitting aperture, and having a variable density pattern on said one side of said light diffusion means facing said light source, said pattern including a plurality of constant density light attenuating arcuate lines, the spaces between said arcuate lines continuously increasing in a manner to cause said film platen to be uniformly illuminated by light passing through said aperture upon the actuation of said light source.

4. In a graphic camera having a copyboard, a film platen for positioning a photosensitive sheet and a half-tone screen thereover, together with a main projection lens positioned upon a projection optical axis for focusing images of objects upon said copyboard at said film platen, the improvement comprising an auxiliary projection device positioned along a second optical axis for exposing said photosensitive sheet to light, said projection device further comprising:
    a. a light source positioned at one portion of said auxiliary projection device;
    b. a light transmitting aperture positioned at another portion of said auxiliary projection device; and
    c. light diffusion means optically positioned intermediate said light source and said aperture and having a variable density pattern thereon including a plurality of light attenuating circular lines concentric with a bullseye point, the spaces between said circular lines continuously increasing along radial paths emanating from said bullseye point in a manner to cause said film platen to be uniformly illuminated upon the actuation of said light source.

5. The combination as set forth in claim 4 wherein said pattern has an attenuation characteristic which decreases as the distance along radial paths emanating from said bullseye point increases, proportional to the cosine$^8$ of the angle between said second optical axis and a straight line between points along said radial paths and the center of said aperture.

6. The combination as set forth in claim 5 wherein said light diffusion means consists of a single light diffusing plate having said pattern formed upon one side thereof.

7. The combination as set forth in claims 4, 5, or 6 wherein said light transmitting aperture consists of a pinhole positioned along said second optical axis.

8. The combination as set forth in claims 4, 5, or 6 wherein said light attenuating lines have a constant density.

9. The combination as set forth in claims 4, 5, or 6 wherein said second axis is parallel to said first axis.

10. In a graphic camera having a copyboard, a film platen for positioning a photosensitive sheet and a halftone screen thereover, together with a main projection lens positioned upon a projection optical axis for focusing images of objects upon said copyboard at said film platen, the improvement comprising an auxiliary projection device, positioned off axis with respect to said projection optical axis and upon a second optical axis separate from said first optical axis for exposing said photosensitive sheet to light, said projection device further comprising:
   a. a light source positioned at one portion of said auxiliary projection device upon said second optical axis;
   b. a light transmitting aperture positioned at another portion of said auxiliary projection device upon said second optical axis;
   c. light diffusion means having one side thereof facing said light source and the other side thereof facing said light transmitting aperture, said sides of said light diffusion means having an area substantially larger than said light transmitting aperture and said light source, and having a variable density pattern on said one side of said light diffusion means facing said light source, said pattern including a plurality of light attenuating circular lines concentric with a bullseye point, the spaces between said circular lines continuously increasing along radial paths emanating from said bullseye point in a manner to cause said film platen to be uniformly illuminated upon the actuation of said light source.

11. The combination as set forth in claim 10 wherein said pattern has an attenuation characteristic which decreases, as the distance along radial paths emanating from said bullseye point increases, proportional to the $\cosine^8$ of the angle between said second optical axis and a straight line between points along said radial paths and the center of said aperture.

12. The combination as set forth in claim 11 wherein said light diffusion means consists of a single light diffusing plate having said pattern formed upon one side thereof.

13. The combination as set forth in claims 10, 11, or 12 wherein said light transmission aperture comprises a pinhole positioned upon said second optical axis.

14. The combination as set forth in claims 10, 11, or 12 wherein said light attenuating lines have a constant density.

15. The combination as set forth in claims 10, 11, or 12 wherein said second axis is parallel to said first axis.

16. The combination as set forth in claims 10, 11, or 12 wherein said bullseye point coincides with said second optical axis.

17. In a graphic camera having a copyboard, a film platen for positioning a photosensitive sheet and a halftone screen thereover, together with a main projection lens positioned upon a projection optical axis for focusing images of objects upon said copyboard at said film platen, the improvement comprising an auxiliary projection device, positioned off axis with respect to said projection optical axis and upon a second optical axis separate from said first optical axis and parallel thereto for exposing said photosensitive sheet to light, said projection device further comprising:
   a. a light source positioned at one portion of said auxiliary projection device upon said second optical axis;
   b. a light transmitting pinhole aperture positioned at another portion of said auxiliary projectioned device upon said second optical axis;
   c. light diffusion means having one side thereof facing said light source and the other side thereof facing said light transmitting aperture, said sides of said light diffusion means having an area substantially larger than said light transmitting ap aperture and said light source, and having a variable density pattern on said one side of said light diffusion means facing said light source, said pattern including a plurality of constant density light attenuating circular lines concentric with a bullseye point, the width of circular lines continuously decreasing along radial paths emanating from said bullseye point in a manner to cause said film platen to be uniformly illuminated upon the actuation of said light source.

18. The combination as set forth in claim 17 wherein said pattern has an attenuation characteristic which decreases as the distance along radial paths emanating from said bullseye point increases, proportional to the $\cosine^8$ of the angle between said second optical axis and a straight line between points along said radial paths and the center of said aperture.

19. The combination as set forth in claim 18 wherein said light diffusion means consists of a single light diffusing plate having said pattern formed upon one side thereof.

20. The combination as set forth in claim 17, 18, or 19 wherein said bullseye point coincides with said second optical axis.

* * * * *